United States Patent
Kusumoto (10) Patent No.: US 11,106,415 B2
(45) Date of Patent: Aug. 31, 2021

(54) MODULE RECEIVING SPECIFIC VALUE FROM HIGHER-LEVEL MODULE AND GENERATING SETTING VALUE USING SPECIFIC VALUE

(71) Applicant: BROTHER KOGYO KABUSHIKI KAISHA, Aichi (JP)

(72) Inventor: Naoki Kusumoto, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/655,355

(22) Filed: Oct. 17, 2019

(65) Prior Publication Data

US 2020/0272395 A1 Aug. 27, 2020

(30) Foreign Application Priority Data

Feb. 27, 2019 (JP) .............................. JP2019-033575

(51) Int. Cl.
G06F 3/12 (2006.01)

(52) U.S. Cl.
CPC .......... *G06F 3/1293* (2013.01); *G06F 3/1229* (2013.01); *G06F 3/1244* (2013.01); *G06F 3/1256* (2013.01); *G06F 3/1258* (2013.01)

(58) Field of Classification Search
CPC .... G06F 3/1293; G06F 3/1229; G06F 3/1244; G06F 3/1256; G06F 3/1258
USPC .................. 358/1.15, 1.9, 1.16, 501, 444
See application file for complete search history.

(56) References Cited

U.S. PATENT DOCUMENTS

| | | | |
|---|---|---|---|
| 9,565,053 B2 | 2/2017 | Kadota | |
| 10,089,560 B2 | 10/2018 | Nakamura | |
| 10,459,668 B2 | 10/2019 | Nakamura | |
| 2006/0238786 A1 | 10/2006 | Sakura et al. | |
| 2006/0238793 A1 | 10/2006 | Akashi et al. | |
| 2008/0259398 A1 | 10/2008 | Osuka et al. | |

(Continued)

FOREIGN PATENT DOCUMENTS

JP 2008-269265 A 11/2008

OTHER PUBLICATIONS

Related U.S. Appl. No. 16/655,307, filed Oct. 17, 2019.
(Continued)

*Primary Examiner* — Quang N Vo
(74) *Attorney, Agent, or Firm* — Scully, Scott, Murphy & Presser, P.C.

(57) ABSTRACT

A non-transitory computer readable storage medium storing a set of program instructions installed on and executed by a computer in an information processing apparatus having a communication interface. The set of program instructions is for inputting data into a printer via the communication interface. The set of program instructions includes a set of first program instructions controlling the computer to function as a module to communicate with a higher-level module than the module. The set of first program instructions includes acquiring a specific value through an API to which the higher-level module inputs the specific value, and acquiring a printer characteristic value dependent on a type of the printer. The set of first program instructions includes generating a setting value by using the specific value and the printer characteristic value, and outputting the generated setting value to the higher-level module.

12 Claims, 4 Drawing Sheets

(56) References Cited

U.S. PATENT DOCUMENTS

| | | |
|---|---|---|
| 2009/0027725 A1* | 1/2009 | Okazawa ............... H04L 63/10 |
| | | 358/1.15 |
| 2009/0168096 A1 | 7/2009 | Toda |
| 2010/0149586 A1 | 6/2010 | Natori |
| 2011/0019222 A1* | 1/2011 | Tang ................... G06F 11/3013 |
| | | 358/1.14 |
| 2013/0033714 A1 | 2/2013 | Nakagawa |
| 2014/0049790 A1 | 2/2014 | Nakamura |
| 2016/0077777 A1 | 3/2016 | Kobayashi et al. |

OTHER PUBLICATIONS

Related U.S. Appl. No. 16/655,327, filed Oct. 17, 2019.
Official Action dated Sep. 9, 2020 from related U.S. Appl. No. 16/655,307.
Office Action dated May 3, 2021 received in U.S. Appl. No. 16/655,327.

\* cited by examiner

FIG. 2 (A)
ptd FOLDER 54

- ptd FILE — 541
- ptd FILE — 541
- ⋮

FIG. 2 (B)
ptd FILE 541

| RESOLUTION | 300 × 300 |
|---|---|
| NUMBER OF PINS | 30 |
| ⋮ | ⋮ |

FIG. 2 (C)
TABLE 55

| MODEL NAME | FILE PATH |
|---|---|
| AAA-001 | aaabbbccc |
| AAA-002 | dddeeefff |
| ⋮ | ⋮ |

FIG. 2 (E)

| SECOND COMMAND | PREPARATION COMMAND |
|---|---|
| FOURTH COMMAND | MODEL NAME |
| FIRST COMMAND | SETTING INFORMATION |
| THIRD COMMAND | TERMINATION COMMAND |

FIG. 2 (D)
DATABASE 56

| MODEL NAME | SHEET TYPE | SHEET WIDTH | | SHEET LENGTH | | MARGIN (WIDTH) | | ... |
|---|---|---|---|---|---|---|---|---|
| | | MAX. | MIN. | MAX. | MIN. | MAX. | MIN. | ... |
| AAA-001 | NON-FIXED LENGTH SHEET | a | b | — | — | g | h | ... |
| AAA-002 | STANDARD SIZE SHEET | c | d | e | f | i | j | ... |
| ⋮ | | | | ⋮ | | | | |

MODULE RECEIVING SPECIFIC VALUE FROM HIGHER-LEVEL MODULE AND GENERATING SETTING VALUE USING SPECIFIC VALUE

CROSS REFERENCE TO RELATED APPLICATION

This application claims priority from Japanese Patent Application No. 2019-033575 filed Feb. 27, 2019. The entire content of the priority application is incorporated herein by reference.

TECHNICAL FIELD

The present disclosure is related to a technique to generate setting values that can be inputted into a printer.

BACKGROUND

There is known a printer that requires the inputting of several parameters to execute printing. For example, a label printer needs such inputs as a parameter indicating the size of a margin, and a parameter indicating the length of a label in order to perform printing. The printer performs printing in response to receiving these parameters.

There is also known an application that transmits to a printer parameter required to perform printing.

SUMMARY

It is an object of this disclosure to provide a program capable of reliably generating setting values that can be inputted into a printer.

In order to attain the above and other objects, the disclosure provides a non-transitory computer readable storage medium storing a set of program instructions installed on and executed by a computer in an information processing apparatus having a communication interface. The set of program instructions is for inputting data into a printer via the communication interface. The set of program instructions includes a set of first program instructions controlling the computer to function as a module to communicate with a higher-level module than the module. The set of first program instructions includes: an API configured to receive a specific value; after the API is called from the higher-level module: acquiring the specific value through the API to which the higher-level module inputs the specific value; acquiring a printer characteristic value dependent on a type of the printer; generating a setting value by using the specific value and the printer characteristic value, the setting value being in a data format which can be inputted to the printer; and outputting the generated setting value to the higher-level module.

According to another aspect, the disclosure provides a non-transitory computer readable storage medium storing a set of program instructions installed on and executed by a computer in an information processing apparatus having a communication interface. The set of program instructions is for inputting data into a printer via the communication interface. The set of program instructions includes a set of first program instructions and a set of second program instructions. The set of first program instructions controls the computer to function as a first module. The set of second program instructions controls the computer to function as a second module lower than the first module to communicate with the first module. The set of first program instructions includes: calling an API; transferring a specific value to the second module while inputting the specific value into the received API; receiving a setting value from the second module via the communication interface; and transmitting the acquired setting value to the printer. The set of second program instructions includes: an API configured to receive a specific value; after the API is called from the first module: acquiring the specific value through the API to which the first module inputs the specific value; and acquiring a printer characteristic value dependent on a type of the printer; generating the setting value by using the specific value and the printer characteristic value, the setting value being in a data format which can be inputted to the printer; and outputting the generated setting value to the first module.

According to still another aspect, the disclosure provides a non-transitory computer readable storage medium storing a set of program instructions installed on and executed by a computer in an information processing apparatus having a communication interface. The set of program instructions is for inputting data into a printer via the communication interface. The set of program instructions includes a set of first program instructions, a set of second program instructions, and a set of third program instructions. The set of first program instructions controls the computer to function as a first module. The set of second program instructions controls the computer to function as a second module lower than the first module to communicate with the first module. The set of third program instructions controls the computer to function as a third module. The set of first program instructions includes: calling an API; transferring a specific value to the second module while inputting the specific value into the received API as an argument; receiving a setting value from the second module via the communication interface; acquiring image data; transferring the received setting value and the acquired image data to the third module; receiving print data from the third module; and transmitting the received print data to the printer. The set of second program instructions includes: an API configured to receive a specific value; after the API is called from the first module: acquiring the specific value through the API to which the first module inputs the specific value as an argument; and acquiring a printer characteristic value dependent on a type of the printer; generating the setting value by using the specific value and the printer characteristic value, the setting value being in a data format which can be inputted to the printer; and outputting the generated setting value to the first module. The set of third program instructions includes: acquiring the setting value and the image data; generating the print data having the acquired setting value based on the acquired image data; and transferring the generated print data to the first module.

BRIEF DESCRIPTION OF THE DRAWINGS

The particular features and advantages of the disclosure as well as other objects will become apparent from the following description taken in connection with the accompanying drawings, in which.

DETAILED DESCRIPTION

An embodiment of the present disclosure will be described while referring to the drawings. The following embodiment is an example, and it would be apparent to those skilled in the art that various changes and modifications may be made thereto. For example, the order of the processes or steps described below may be modified within the scope of the invention.

Figure 1:
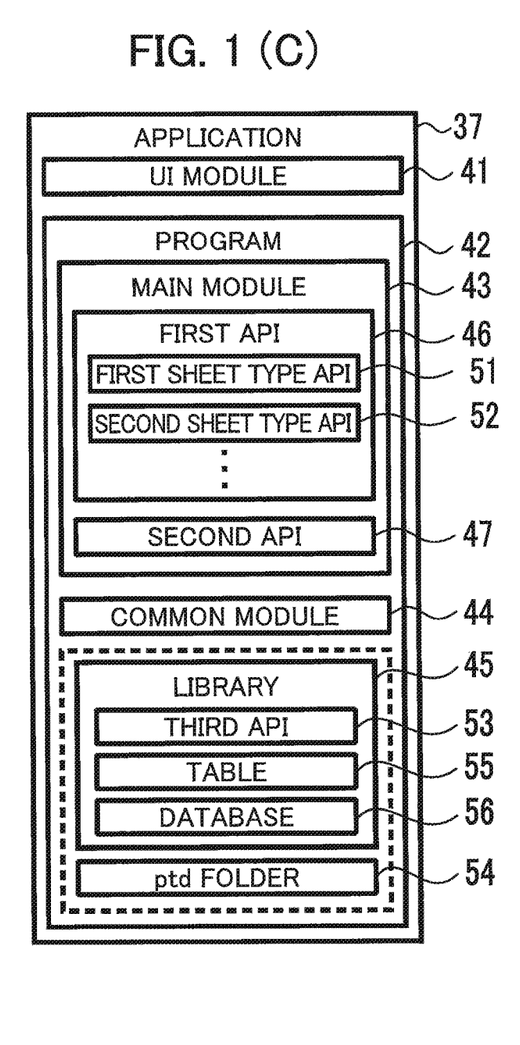
FIG. 1(A) is an explanatory diagram illustrating an information processing apparatus and a printer.
FIG. 1(B) is a block diagram illustrating the information processing apparatus.
FIG. 1(C) is a block diagram illustrating an application installed on the information processing apparatus.

An information processing apparatus 10 shown in FIGS. 1(A)-1(C) will be explained. The information processing apparatus 10 is a mobile terminal, a tablet, or a personal computer, for example. In the following example, the information processing apparatus 10 is a mobile terminal.

The information processing apparatus 10 is provided with an application 37. The application 37 is a program that transmits print data to a printer 11, enabling the printer 11 to print the print data. In the embodiment, the printer 11 executes the print according to the application 37 implemented on the information processing apparatus 10 as described later.

The printer 11 is a label printer that prints images on labels. The printer 11 includes a controller (not shown) and a print engine (not shown). The print engine includes a conveyance mechanism configured to convey a sheet such as a label, and a print head configured to print an image on the conveyed sheet. The print head is a thermal head. The printer 11 need not be a label printer. The print engine may be any type that can print an image on a sheet.

The controller of the printer 11 includes a CPU (Central Processing Unit), a memory, and a communication interface. The configuration of the communication interface in the printer 11 is substantially the same as a communication interface 23 in the information processing apparatus 10 described later. The printer 11 can communicate with the information processing apparatus 10 via its communication interface.

The configuration of the memory in the printer 11 is substantially the same as a memory 32 in the information processing apparatus 11 described later. Normal sheet settings are pre-stored in the memory of the printer 11. The normal sheet settings indicate whether a sheet is a standard-size sheet or a non-fixed length sheet. For standard-size sheets, the normal sheet settings further indicate parameters (or setting values), such as the width and length of the sheet, the sizes of margins on the sheet with respect to a longitudinal direction, and the size of margins on the sheet with respect to a widthwise direction. The standard-size sheets are die-cut sheets.

The memory of the printer 11 stores a control program executed by the CPU. The control program executed by the CPU controls the print engine to print an image represented by print data inputted via the communication interface on the sheet.

The control program cannot process data in a text format, but can process data in a binary format. As described later, an application 37 in the information processing apparatus 10 generates print data and a command in the binary format, and transmits the print data and the command to the printer 11. The binary format is a data format that the printer can read.

The information processing apparatus 10 includes a controller 21, a touch panel 22, and a communication interface (IF) 23.

The communication IF 23 is an interface configured to transmit and receive data such as print data according to a standard for communication such as wireless communication. The information processing apparatus 10 is configured to communicate directly with the printer 11 via the communication IF 23, or to communicate indirectly with the printer 11 via one or more access points included in a communication line such as a LAN. For example, the communication IF 23 is configured to communicate with the printer 11 according to a communication standard, such as Wi-Fi (registered trademark) or Bluetooth (registered trademark), or according to a communication standard for a near-field communication network, such as NFC. The communication IF 23 is an example of a communication interface.

The touch panel 22 includes a display panel 24 and a touch sensor 25 laid over the display panel 24. The display panel 24 is configured to display characters and figures. The touch sensor 25 is a transparent film. The touch sensor 25 is configured to output position data indicating a position on the display panel 24 that the user touches. The position data is expressed by a coordinate (x, y) in an x-y plane, where the upper-left end of the display panel 24 is set as the origin, the rightward direction corresponds to the x-direction, and the downward direction corresponds to the y-direction. A UI module 41 described later determines that a user selected an icon when receiving position data of the icon displayed on the display panel 24 from the touch sensor 25. The user inputs text or numerical values into the UI module 41 by touching objects such as icons.

The touch sensor 25 is an example of a user interface. The information processing apparatus 10 may include a microphone instead of or in addition to the touch sensor 25. The microphone is configured to convert the user's voice into sound data and input the sound data into the controller 21. The microphone is an example of the user interface.

The controller 21 includes a CPU (Central Processing Unit) 31, a memory 32, and a bus 33. The CPU 31 is an example of a computer.

The controller 21 is implemented by a patterned substrate and various electronic components mounted on the patterned substrate, such as a microcomputer, ICs, capacitors, and diodes.

The CPU 31 and the memory 32 are connected to the bus 33. The CPU 31 is configured to execute an OS 36 and the application 37 stored in the memory 32 described later. The OS 36 or the application 37 executed by the CPU 31 reads data or information from the memory 32, and writes data or information to the memory 32.

The CPU 31 is configured to execute the OS 36, and the UI module 41, a main module 43, a common module 44, and a library 45 of the application 37 (described later) in parallel or pseudo-parallel. In other words, the OS 36, the UI module 41, the main module 43, the common module 44, and the library 45 are executed through multitasking.

The memory 32 is a ROM, a RAM, an EEPROM, an HDD, or a buffer provided in the CPU 31. The memory 32 includes a program storage area 34 storing the OS 36 and the application 37, and a data storage area 35 storing information and data.

The data storage area 35 stores a model name and an application name correlated with each other. The model name indicates the type of the printer 11. The application name indicates the name of the application 37. When the application 37 is installed on the information processing apparatus 10 and/or settings for the installed application 37 are made, the OS 36 registers the model name of the printer designated by the user via the touch panel 22 in the data storage area 35 in correlation with the application name Alternatively, the model name of the printer 11 is registered as the application name when the application 37 is installed and set.

The OS 36 is Android (registered trademark), iOS (registered trademark), Windows Phone (registered trademark), or BlackBerry OS (registered trademark).

The OS 36 includes a fourth API (Application Programing Interface) 38 which is called by the application 37. The information processing apparatus 10 uses the fourth API 38 to communicate with the printer 11 via the communication IF 23. A DLL (Dynamic Link Library) provided in the OS 36 includes the fourth API 38.

The application 37 has a function to generate print data and to transmit the print data to the printer 11 via the communication IF 23. The application 37 further has a function to generate a customized setting and to transmit the generated customized setting together with the print data to the printer 11. Here, the customized setting is a sheet setting (a setting related to a sheet) different from the normal sheet settings pre-stored in the memory of the printer 11.

The application 37 includes the UI (User Interface) module 41, and a program 42. The UI module 41 is for receiving user input. The program 42 is for generating the print data and the customized setting, and for transferring the print data and the customized setting to the printer 11. The UI module 41 is an example of a receiving module. The application 37 and the program 42 are examples of a program. The normal sheet settings need not be pre-stored in the memory of the printer 11. In such a case, the application 37 transmits the print data, and the customized setting or the normal sheet settings to the printer 11.

The UI module 41 has a higher hierarchy than the program 42, and thus the program 42 executes processes according to instructions or commands transmitted from the UI module 41. The instructions or commands are transmitted to the program 42 from the UI module 41 via an API included in the program 42, for example. The application 37 defines program instructions, and thus the UI module 41 defines a group of program instructions for controlling the CPU 31 to function as a processing module or as one processing unit.

The UI module 41 is designed by the developer of the application 37. The developer of the application 37 designs the UI module 41 according to the type of the OS 36, such as Android or iOS. Specifically, the UI module 41 is written in the same programming language as the OS 36 so that the UI module 41 can use functions provided by the fourth API 38 of the OS 36.

The vendor of the printer 11 provides the program 42 to the developer of the application 37. That is, the program 42 is what is called an SDK (Software Development Kit). The developer of the application 37 develops the application 37 by incorporating the program 42 provided by the vendor of the printer 11 with the designed module 41.

The program 42 has configurations for facilitating development of the application 37 by the developer, as described below.

The program 42 includes the main module 43, the common module 44, the library 45, and a ptd folder 54. The main module 43 is an example of a higher-level module than the common module 44 and the library 45. The common module 44 is an example of a generation module. The library 45 is an example of a module. In other words, each of the modules 43, 44, 45 is a program unit configuring the program 43. In the program 42, a lower-level module (for example, the library 45) executes processes according to instructions or commands from a higher-level module (for example, the main module 43). The instructions or commands are transmitted from the higher-level module to the lower-level module via an API included in the lower-level module. The program 42 defines program instructions, and thus each module (43, 44, or 43) defines a corresponding group of program instructions for controlling the CPU 31 to function as a processing module or as one processing unit.

The main module 43 has a function to receive information and data from the UI module 41 via the OS 36. Specifically, the main module 43 includes a first API 46 and a second API 47 which are called by the UI module 41 via the OS 36.

The first API 46 (each of a first sheet type API 51 and a second sheet type API 52 descried below) is configured to require input of setting information in a data format different from the binary format. Here, the data format different from the binary format is a text format for example. The setting information indicates a width, a length, and sizes of margins for a sheet that are inputted by the user using the touch panel 22, for example. The UI module 41 transfers the setting information (the width, length, and sizes of margins for the sheet, for example) to the program 42 by inputting as arguments the setting information without modification to the first API 46. That is, the UI module 41 need not convert the setting information into data in the binary format. Accordingly, the UI module 41 and the application 37 can be easily developed.

The first API 46 includes the first sheet type API 51 and the second sheet type API 52. The first sheet type API 51 corresponds to a sheet of the standard size for example. The second sheet type API 52 corresponds to a non-fixed length sheet (or variable-length sheet) whose (remaining) length is changed when used, such as a roll sheet. That is, setting information required as arguments by the first sheet type API 51 is different from setting information required as arguments by the second sheet type API 52. For example, the first sheet type API 51 corresponding to the standard size sheet requires as arguments the width of the sheet, the length of the sheet, the sizes of margins on the sheet in the width direction and in the longitudinal direction, and a pitch (or length) between labels. The second sheet type API 52 corresponding to the non-fixed length sheet requires as arguments the width of the sheet, the length of the sheet, and the sizes of margins on the sheet in the width direction and in the longitudinal direction.

The UI module 41 calls one of the APIs 51 and 52 in the first API 46 corresponding to the type of the sheet designated by the user through the touch panel 22. Specifically, when the user designates a standard size sheet, the UI module 41 calls the first sheet type API 51 and transfers values such as the width of the sheet, the length of the sheet, the sizes of the margins on the sheet in the width direction and in the longitudinal direction, and the pitch (or length) between labels to the main module 43 by inputting these values, as arguments, into the first sheet type API 51. On the other hand, when the user designates a non-fixed length sheet, the UI module 41 calls the second sheet type API 52 and transfers the values such as the width of the sheet, the length of the sheet, the sizes of the margins on the sheet in the width direction and in the longitudinal direction to the main module 43 by inputting these values, as arguments, into the second sheet type API 52.

The second API 47 is used when the main module 43 receives a customization file from the UI module 41. The customization file includes a customized setting. The customized setting is in the binary format that the printer 11 can process. An information processing apparatus (a personal computer, for example) other than the information processing apparatus 10 may generate a customization file, and the generated customization file may be inputted into the information processing apparatus 10, for example. In such a case, the UI module 41 transfers the customization file as is to the main module 43 as an argument or transfers a path designating the location of the customization file to the main module 43 as an argument so that the main module 43 can acquire the customization file. Since the main module 43 is provided with not only the first API 46 but also the second API 47, the main module 43 can receive from the UI module 41 setting information for generating a customized setting, and the customized setting itself.

The common module 44 is configured to generate print data from image data. The common module 44 includes an API (not shown) to receive from the main module 43 the image data or a path designating the location of the image data.

The common module 44 further includes an API (not shown) to receive a customized setting or a path designating the location of the customized setting from the main module 43. The common module 44 is configured to generate transmission data and to transfer the generated transmission data to the main module 43, as will be described later. The transmission data includes the customized setting received from the main module 43 and the generated print data.

The library 45 generates the customized setting and transfers the generated customized setting to the main module 43. The common module 44 does not include a function to generate the customized setting, but the library 45, which is a different module from the common module 44, includes such a function. Accordingly, the common module 44 can be designed using an existing program for generating print data, thereby facilitating the development of the program 42.

The library 45 includes a third API 53, a table 55, and a database 56. The third API 53 is an example of an API. The library 45 and the ptd folder 54 are stored in a same folder, as shown in a dotted rectangle of FIG. 1(C). Alternatively, the ptd folder 54 may be stored in a subfolder of the folder in which the library 45 is stored.

The third API 53 is an API called by the main module 43. The library 45 receives the setting information from the main module 43 via the third API 53. Specifically, the third API 53 requests setting information to be set as an argument from the main module 43 while specifying a data format for the setting information. In response, the main module 43 inputs as an argument the setting information in the data format specified by the third API 53 into the third API 53. The library 45 receives the setting information in the data format specified by the third API 53, that is, the data format that the library 45 can process.

Figure 2:
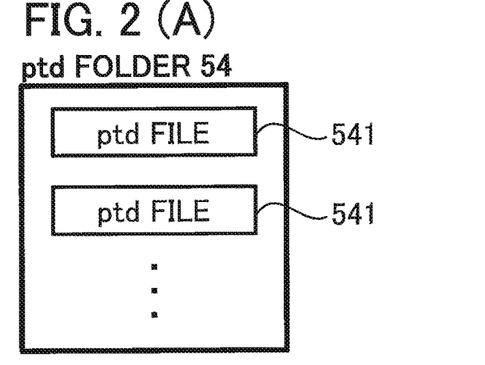
FIG. 2(A) is a block diagram illustrating a ptd folder.
FIG. 2(B) is an explanatory diagram illustrating a ptd file.
FIG. 2(C) is an explanatory diagram illustrating a table.
FIG. 2(D) is an explanatory diagram illustrating a database.
FIG. 2(E) is an explanatory diagram illustrating commands included in a customized setting.

As shown in FIG. 2(A), the ptd folder 54 can store a plurality of ptd files 541. Each ptd file 541 includes function information indicating the functions of one type of printer 11. Specifically, as shown in FIG. 2(B), the function information stored in a ptd file 541 includes numerical values indicating a resolution, and a numerical value specifying the number of pins in the print head of the printer 11. The ptd file 541 is the same as files conventionally implemented in printer drivers. The ptd file 541 is an example of a setting file. The function information is an example of a characteristic value and an example of a first characteristic value.

As shown in FIG. 2(C), the table 55 includes correlations. Here, each correlation is between a model name of the printer 11 and a file path for a ptd file 541 corresponding to the model name The file path is information indicating the storage location of the ptd file 541 in the ptd folder 54. In this example, the file path is a relative path indicating the location of the ptd file 541 relative to the ptd folder 54. The file path is used to identify the ptd file 541 corresponding to the model name, as will be described later. The model name may be a series name of the printer 11.

The database 56 includes records. Each record correlates a model name that specifies the type of the printer 11 with sheet function information related to a sheet. As shown in FIG. 2(D), the sheet function information includes a sheet type, a maximum sheet width, a minimum sheet width, a maximum sheet length, a minimum sheet length, a maximum margin in the width direction, and a minimum margin in the width direction, for example. The sheet type is either the non-fixed length sheet or the standard-size sheet. The sheet function information is an example of a printer characteristic value and an example of a second characteristic value. The model name is an example of type information.

The library 45 generates a customized setting in the binary format, which can be inputted into the printer 11, by using setting information transferred from the main module 43 via the third API 53, a model name of the printer 11 transferred from the main module 43 via an API (not shown), a ptd file 541, and the database 56.

The library 45 provides the common module 44 with the function information in the ptd file 541 via the main module 43 so that the common module 44 can refer to the function information when the common module 44 generates the print data. That is, the customized setting to be inputted into the printer 11 is generated using the function information that is referenced when generating the print data.

The library 45 and the common module 44 are written in the C++ programming language. Any program can use the library 45 by transferring information and data to the library 45, provided that the program can transfer information and data relative to another program written in the C++ programming language. Here, the program that can transfer information and data relative to another program written in the C++ programming language is a program written in Objective-C, or a program written in Java (registered trademark) having a wrapper, such as the JNI (Java Native Interface). The main module 43 is a program that can transfer information and data to a program written in the C++ programming language.

Figure 3:
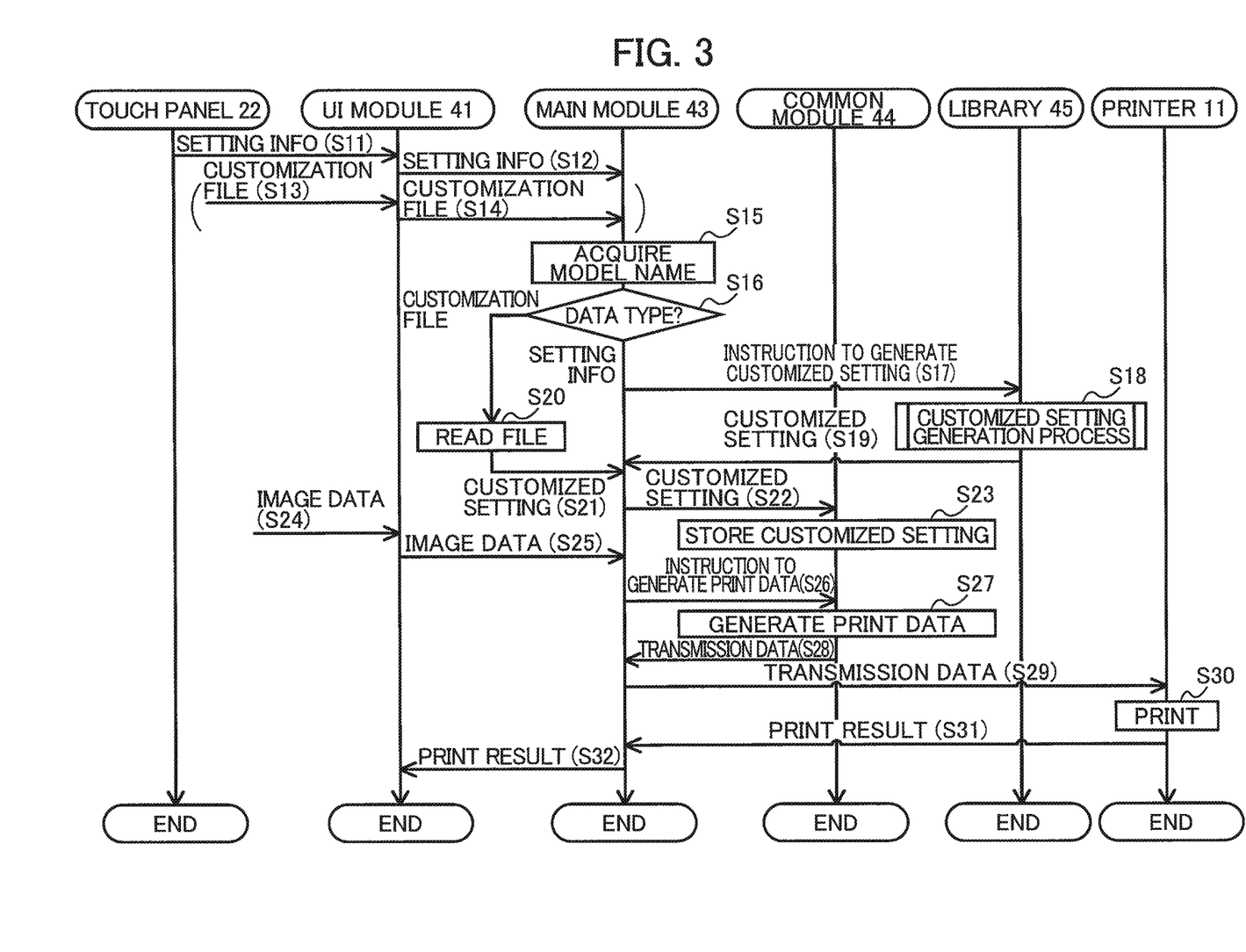
FIG. 3 is a sequence diagram illustrating a process executed by the application.
Figure 4:
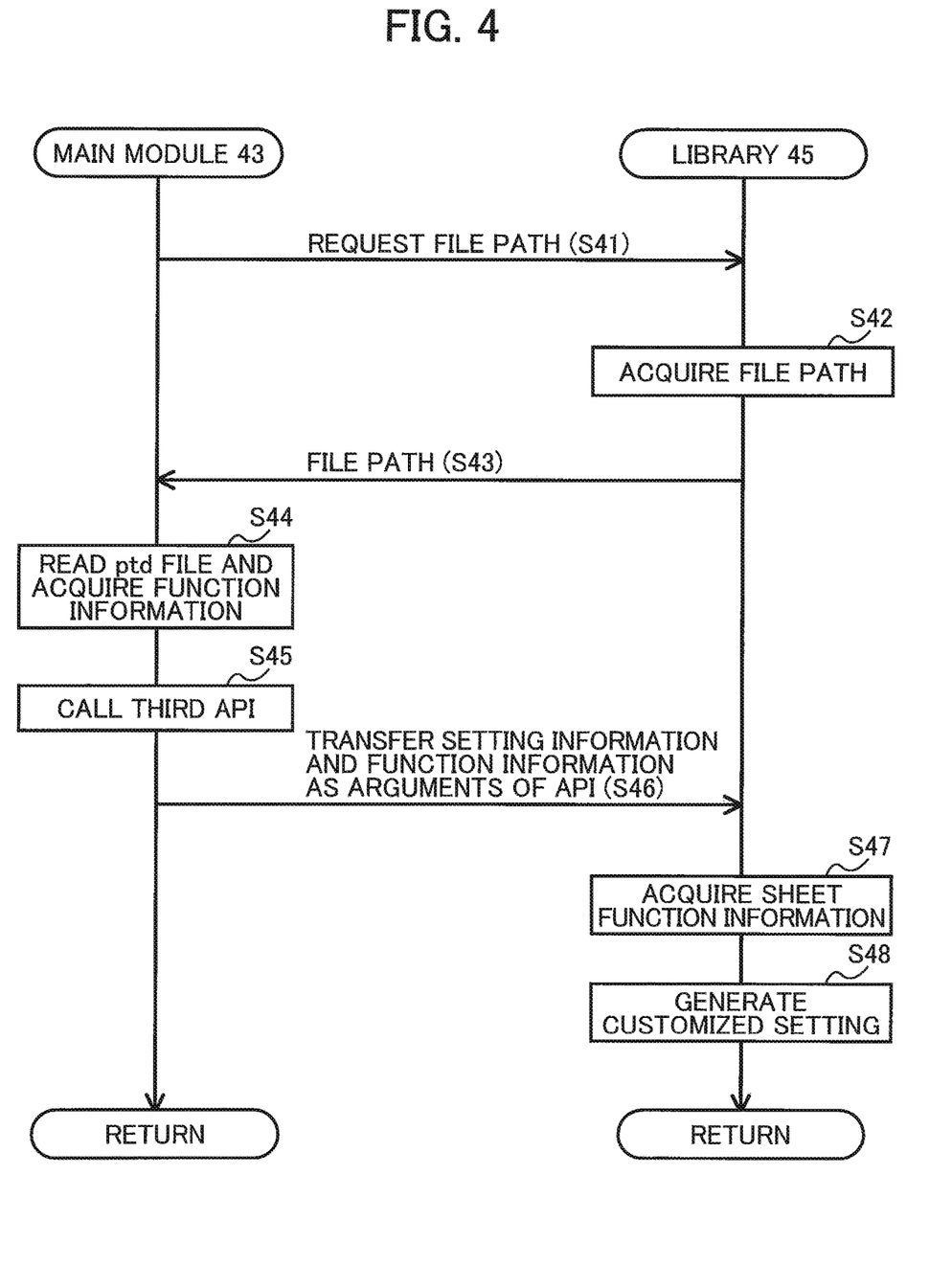
FIG. 4 is a sequence diagram illustrating a process executed between a main module and a library.

Referring to FIGS. 3 and 4, an explanation will be made for processes executed by the CPU 31 according to the UI module 41 of the application 37, and the main module 43, common module 44, and library 45 of the program 42.

The processes explained below are performed by the CPU 31 according to instructions by the application 37. In the following explanation, actions such as "determine," "extract," "select," "calculate," "decide," "identify," "acquire," "receive," "control," "set," and the like represent processes performed by a controller such as the CPU 31. Processes performed by the CPU 31 include processes that control hardware through the OS 36. "Acquiring" is used as a concept that does not necessarily require a request. In other words, a process by which the CPU 31 receives data without requesting that data is included in the concept of "the CPU 31 acquires data." "Data" as described herein refer to bit strings that can be read by a computer. Data of different formats are treated as the same data when the content of the data is essentially the same. The same holds true for "information" in this specification. An "instruction," a "response," or a "request" is processed by communicating information indicating the "instruction," the "response," or the "request." The terms "instruction," "response," and "request" may also be used to describe information indicating an "instruction," a "response," or a "request."

A process executed by the CPU 31 according to instructions described in a program may be described using abbreviated expressions, such as "the CPU 31 executes," "the main module 43 executes," "the common module 44 executes," and "the library 45 executes."

Further, a process performed by the CPU 31 to determine whether information A indicates circumstance B may be described conceptually as "determining whether circumstance B based on information A." A process in which the CPU 31 determines whether information A indicates circumstance B or circumstance C may be described conceptually as "determining whether circumstance B or circumstance C based on information A."

The terms "data" and "information" used in this specification share aspects of being bits or bit strings that computers can handle. The computer treats "data" without considering the significance of its individual bits. In the case of "information," on the other hand, the computer's operations branch based on the significance of the individual bits. Additionally, a "command" or "instruction" is a control signal prompting the destination device to perform the next operation. A command or instruction may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, a phrase such as "in response to" in this specification indicates that the process specified before the phrase is to be executed when the condition specified after the phrase has been met. Note that the timing at which the process is executed should be after the condition has been met, but need not be immediately after the condition is met.

The application 37 is started by the OS 36 according to an instruction from another application that generates image data, for example. The user designates the model name of the printer 11 via the touch panel 22, and then the OS 36 starts the application 37 correlated with the designated model name of the printer 11.

The UI module 41 of the started application 37 controls the touch panel 22 to display a screen for receiving inputs by the user. The screen includes a pull-down menu that allows the user to select the sheet type, and text boxes that receive the width and length of the sheet, and the sizes of margins. In S11 of FIG. 3, the user inputs setting information indicating the sheet type, the width and length of the sheet, and the sizes of the margins by using the touch panel 22. The setting information inputted by the user is an example of a user input value. The process in S11 is an example of a receiving process.

After receiving the input of the setting information, the UI module 41 calls one of the APIs in the first API 46 corresponding to the sheet type in the setting information. Specifically, for cases in which the sheet type indicates a standard-size sheet, the UI module 41 calls the first sheet type API 51. For cases in which the sheet type indicates the non-fixed length sheet, the UI module 41 calls the second sheet type API 52. In S12 the UI module 41 transfers the received setting information to the main module 43 of the program 42 by setting the setting information as arguments of the called API (51 or 52) of the first API 46. The process in S12 is an example of a process for transferring a user input value. In S12 the main module 43 acquires the setting information from the UI module 41. The process S12 is an example of a process for acquiring a user input value.

Alternatively, instead of receiving the setting information through the touch panel 22, in S13 the UI module 41 may receive a customization file inputted from the other information processing apparatus different from the information processing apparatus 10, as described above. After receiving the customization file, the UI module 41 calls the second API 47. In this case, in S14 the UI module 41 transfers the received customization file or a path designating the customization file to the main module 43 by setting the customization file or the path as an argument of the called second API 47. Accordingly, in S14 the main module 43 acquires the customization file from the main module 43 via the second API 47.

After receiving the setting information or the customization file, in S15 the main module 43 acquires the model name of the printer 11. For example, the main module 43 acquires from the OS 36 the model name specified by the user when the OS 36 started the application 37. Alternatively, the memory 32 may store the model name in correlation with the main module 43, and the main module 43 may read the model name correlated with the main module 43 itself from the memory 32. Alternatively, the main module 43 may receive the model name together with the setting information from the UI module 41. The process in S15 is an example of a process for acquiring type information.

In S16 the main module 43 determines whether the information inputted from the UI module 41 is setting information or a customization file. For cases in which the acquired information is setting information (S16: setting information), in S17 the main module 43 instructs the library 45 to generate a customized setting which is a command in the binary format that can be inputted into the printer 11.

In response to receiving the instruction to generate the customized setting, in S18 the library 45 performs a customized setting generation process shown in FIG. 4.

In the customized setting generation process, the library 45 acquires function information such as the resolution included in the ptd file 541 (FIG. 2(B)), which is stored in the same folder as the library 45, from the main module 43 (S41-S46). The library 45 does not have a function to read a file and acquire information and data from the file. On the other hand, the main module 43 has a function to read a file and acquire information and data from the file. The main module 43 reads the ptd file 541 and transfers the function information included in the ptd file 541 to the library 45.

Specifically, in S41 the main module 43 requests of the library 45 the file path corresponding to the model name acquired in S15. The request is made using an API or a function.

In response to receiving the request, in S42 the library 45 selects and acquires the file path corresponding to the model name in the request from the table 55 (FIG. 2(C)). Subsequently, in S43 the library 45 transfers the file path to the main module 43. Here, the file path is a relative path from the folder 54 to the ptd file 541, and thus does not include a folder path described below. The file path may be a file name.

The main module 43 identifies the ptd file 541 using the file path received from the library 45 and the folder path stored in the memory 32. The folder path is an absolute path indicating the location of the ptd folder 54 from a root folder. Specifically, the main module 43 identifies the ptd folder 54 designated by the folder path and the ptd file 541 designated by the file path in the identified ptd folder 54. In S44 the main module 43 reads the ptd file 541 and acquires the function information from the ptd file 541. Here, the main module 43 acquires the folder path when the application 37 is installed and set up.

In S45 the main module 43 calls the third API 53 included in the library 45, and sets the function information included in the ptd file 541 and the setting information acquired in S13 as arguments of the third API 53 so as to transfer the function information and the setting information to the library 45 in S46. The process in S46 is an example of a process for transferring a designation value.

In S46 the library 45 acquires the function information and the setting information set as the arguments of the third API 53 from the main module 43. The process in S46 is an example of a process for acquiring a designation value and a process for acquiring a characteristic value.

Through the processes of S45 and S46, the main module 43 calls the third API 53 to transfer the setting information and the function information to the library 45. These processes will be explained in detail. The third API 53 is a class in this example. In response to a request from the main module 43, the library 45 transfers the class (third API 53) to the main module 43. The main module 43 inputs into the class the setting information and the function information in the data format required by the class so as to create an instance of the class which is also referred to as an object. The main module 43 transfers the created instance to the library 45. The library 45 processes the instance to generate a customized setting. Because the instance is created based on the class transferred from the library 45, the library 45 can reliably process the instance created by the main module 43. In other words, the library 45 can reliably generate a customized setting in the binary format that can be inputted into the printer 11 based on setting information that the main module 43 acquired from the UI module 41.

After the library 45 acquires the setting information and the function information from the main module 43, in S47 the library 45 identifies the sheet function information in the database 56 (FIG. 2(D)) that corresponds to the model name acquired from the main module 43, and acquires the identified sheet function information. In S48 the library 45 generates a customized setting in the binary format based on the function information, the setting information, and the sheet function information.

There may be cases in which the function information included in the ptd file 541 and the sheet function information included in the database 56 have setting values for the same setting item. For example, there may be a case in which the ptd file 541 has setting values for a maximum width and a minimum width of the sheet in the function information, and the database 56 also has setting values for a maximum width and a minimum width of the sheet in the sheet function information. In such a case, the library 45 gives higher priority to the setting values in the function information of the ptd file 541 than the setting values in the sheet function information of the database 56. In other words, the library 45 acquires all of the setting values in the ptd file 541, and acquires from the database 56 only those setting values whose setting items are not included in the ptd file 541.

As shown in FIG. 2(E), the customized setting includes all of a first command, a second command, a third command, and a fourth command Alternatively, the customized setting may include only the first command, the second command, and the fourth command Alternatively, the customized setting may include only the first command, the third command, and the fourth command Alternatively, the customized setting may include only the first command, and the fourth command Alternatively, the customized setting may include only the first command.

The first command is a command for inputting into the printer 11 the setting values which are determined to be included in the customized setting from among the setting information, the function information, and the sheet function information. Here, the setting values are represented in the binary format. The second command is a preparation command that instructs the control program of the printer 11 to prepare for receiving commands or data in the raster data format (or notify the control program of the printer 11 that the commands or data in the raster data format is transmitted). In other words, the second command is for prompting a transmission destination of the second command (the printer 11) to interpret data to be received as raster data. Accordingly, if the printer 11 receives the second command, and subsequently receives data having raster data and partial data which is the same as a command, the printer 11 can correctly interpret and process the subsequently received data as the raster data, and thus be prevented from recognizing erroneously the received data as a command. The third command is a termination command that instructs the printer 11 to terminate the preparation command. The fourth command is a command for inputting into the printer 11 a model name represented in the binary format.

For cases in which only a customized setting is to be transmitted to the printer 11, the customized setting is generated so as to include all the commands For cases in which the customized setting is to be transmitted to the printer 11 after transmitting to the printer 11 other data (image data) represented in the raster data format, the second command is not needed in the customized setting, and thus the customized setting is generated so as to include the first command, the third command, and the fourth command but not the second command For cases in which the customized setting is to be transmitted to the printer 11 and other data represented in the raster data format is to be transmitted to the printer 11 thereafter, the third command is not needed in the customized setting, and thus the customized setting is generated so as to include the first command, the second command, and the fourth command but not the third command. For cases in which the first command is needed in the customized setting for performing debugging, for example, the customized setting is generated so as to include the first command only.

More specifically, the library 45 sets one or more commands to be included in the customized setting according to the request from the main module 43. For example, the request may include command type information indicating types of commands. The request set as an argument of the third API 53 is transferred from the main module 43 to the library 45 in S46. Instead of the request, the command type information set as an argument of the third API 53 may be transferred from the main module 43 to the library 45 in S46. The process in S46 is an example of a process for acquiring command type.

In S48 the library 45 generates a customized setting including one or more commands of the command types requested by the main module 43. More specifically, the library 45 calculates all of the parameters (or setting values) concerning the sheet on the basis of the setting information, the function information, and the sheet function information. For example, the library 45 determines whether each of the width and length of the sheet and the margin sizes in the width direction and in the longitudinal direction in the setting information is within a range defined by a corresponding maximum value and minimum value defined in the sheet function information. When each of the width and length of the sheet and the margin sizes in the width direction and in the longitudinal direction in the setting information is within the corresponding range, the library 45 generates a customized setting that includes the width and length of the sheet and the margin sizes in the width direction and the longitudinal direction specified in the setting information. Further, the library 45 calculates other sheet-related parameters (for example, a heat level of the thermal head) not included in the setting information. The library 45 generates a setting command that instructs the printer 11 to set the calculated parameters, and a header command accompanying the setting command. The setting command and the header command are generated in the binary format. The generated setting command and header command are included in the customized setting. The customized setting is an example of a setting value. The process in S48 is an example of a process for generating a setting value.

As shown in FIG. 3, in S19 the library 45 transfers the generated customized setting to the main module 43. The process in S19 is an example of a process for outputting a setting value.

In S19 the main module 43 acquires the customized setting from the library 45. The process in S19 is an example of a process for acquiring a setting value.

On the other hand, when in S16 the main module 43 determines that the received data is a customization file (S16: customization file), the main module 43 skips S17 and 519, in S20 reads the acquired customization file, and in S21 acquires the customized setting from the customization file.

In S22 the main module 43 transfers the customized setting acquired in S19 or S21 to the common module 44 via an API.

In S23 the common module 44 stores in the memory 32 the customized setting transferred from the main module 43.

In S24 the UI module 41 receives a print instruction and image data from the other application described above. In S25 the UI module 41 transfers the received image data or a path designating the location of the image data to the main module 43 by setting the received image data or the path designating the location of the image data as an argument of an API (not shown) included in the main module 43.

In S25 the main module 43 receives the image data from the UI module 41. The process in S25 is an example of a process for acquiring image data. In S26 the main module 43 transfers the acquired image data to the common module 44 using the API (not shown) included in the common module 44 so as to instruct the common module 44 to generate print data. The process S26 is an example of a transferring process.

In S27 the common module 44 generates print data based on the received image data and the function information (the setting values in the function information) included in the customized setting. Further, the common module 44 generates transmission data including the print data and the customized setting stored in S23. The print data and the customized setting included in the transmission data are generated in the binary format. The process in S27 is an example of a process for generating print data.

In S28 the common module 44 transfers the generated transmission data or a path designating the location of the transmission data to the main module 43. The process in S28 is an example of a process for transferring print data.

In S28 the main module 43 receives the transmission data from the common module 44. The process in S28 is an example of a process for acquiring the print data. In S29 the main module 43 calls the fourth API 38 included in the OS 36 and instructs through the fourth API 38 the OS 36 to transmit the acquired transmission data to the printer 11 so that the transmission data is transmitted to the printer 11 via the OS 36. The process in S29 is an example of a transmitting process.

In response to receiving the print data and the customized setting from the information processing apparatus 10, in S30 the printer 11 prints an image represented by the print data on the sheet according to the customized setting. In S31 the printer 11 transmits a print result to the main module 43 via the OS 36. The print result indicates completion of the printing. In S32 the main module 43 transmits the print result to the UI module 41.

In response to receiving the print result indicating completion of the printing, the application 37 ends the process.

Effects of Embodiment

The library 45 acquires the setting information by using the third API 53 which requires the setting information as arguments while designating the data format of the setting information. That is, the library 45 can acquire the setting information in a data format that the library 45 can process. Accordingly, the library 45 can reliably generate the customized setting in a data format that can be inputted into the printer 11 based on the setting information and the function information.

The library 45 includes the database 56, and can generate a customized setting by acquiring sheet function information from the database 56. Accordingly, the library 45 can reliably generate the customized setting.

The library 45 includes the ptd file 541 which is the same as files conventionally implemented in printer drivers. The library 45 generates the customized setting by acquiring the function information from the ptd file 541. Accordingly, the library 45 can generate a customized setting using the existing ptd file 541. Further, for cases in which a new type of printer is provided from the vendor, the library 45 can generate a customized setting for the new type of printer by adding to the folder which stores the library 45 a ptd file 541 identical to a file implemented in a printer driver for the new type of printer.

In a case where the function information included in the ptd file 541 and the sheet function information included in the database 56 have setting values for the same setting item, the library 45 generates the customized setting while giving higher priority to the setting value in the function information than the setting value in the sheet function information. That is, the library 45 gives higher priority to the function information so that the common module 44 uses the function information to generate the print data. Accordingly, the print data can be generated while giving higher priority to the parameters in the function information. The printer 11 can reliably print an image on the sheet based on the customized setting and the print data.

The library 45 transfers the class to the main module 43, enabling the main module 43 to generate an instance that the library 45 can process. The main module 43 generates the instance by inputting into the class the setting information and the function information in the data format that the class designates. The main module 43 transfers the generated instance to the library 45. The library 45 receives the instance from the main module 43. Accordingly, the library 45 can acquire the instance that was generated using the setting information and the function information and that the library 45 can process. The library 45 processes the instance to generate the customized setting in a format that can be inputted into the printer 11. The library 45 transfers the generated customized setting to the main module 43. Accordingly, the library 45 does not receive setting information and function information from the main module 43 in a data format that the library 45 cannot process. In other words, the library 45 does not receive an instance that the library 45 cannot process from the main module 43. Therefore, the library 45 can process the received instance from the main module 43 to generate a customized setting reliably.

In response to the request from the main module 43, the library 45 selects one or more commands to be included in the customized setting from among the first, second, third, and fourth commands For example, the printing speed of the printer can be increased by excluding the second command and the third command from the customized setting. Further, debugging can be facilitated by excluding the second command, the third command, and the fourth command from the customized setting, thereby facilitating development of the application 37.

The library 45 is written in the C++ programming language. Any program can use the library 45 by transmitting data and information to the library 45, provided that the program can transfer data and information to another program that is written in the C++ programming language.

[Modifications]

In the embodiment described above, the width and length of the sheet and the sizes of margins are explained as examples of setting information. However, the setting information may be other information.

In the embodiment, the customized setting includes values acquired from the setting information, the function information, and the sheet function information. However, the customized setting may include values acquired only from the setting information and the function information, and not from the sheet function information.

In the embodiment, the transmission data including the customized setting and the print data is transmitted to the printer 11. However, the customized setting and the print data may be transmitted individually to the printer 11.

In the embodiment, the library 45 does not have a function to read files. Thus, the library 45 transfers the file path to the main module 43, which has a function to read files, and acquires the function information from the main module 43. However, the library 45 may include a function to read files.

In this case, the main module 43 and the library 45 performs the following processes instead of steps S41-S46 shown in FIG. 4.

That is, the main module 43 transfers the folder path of the ptd folder 54 and the model name to the library 45. In response to receiving the folder path and the model name, the library 45 selects the file path corresponding to the model name from the table 55, and identifies the ptd file 541 in the ptd folder 54 based on the selected file path and the received folder path. The library 45 reads the identified ptd file 541, and acquires the function information included in the ptd file 541.

What is claimed is:

1. A non-transitory computer readable storage medium storing a set of program instructions installed on and executed by a computer in an information processing apparatus having a communication interface, the set of program instructions being for inputting data into a printer via the communication interface, the set of program instructions including a set of first program instructions controlling the computer to function as a module to communicate with a higher-level module than the module, the set of first program instructions comprising:
an API configured to receive a specific value;
after the API is called from the higher-level module:
acquiring the specific value through the API to which the higher-level module inputs the specific value;
acquiring a printer characteristic value dependent on a type of the printer;
generating a setting value by using the specific value and the printer characteristic value, the setting value being in a data format which can be inputted to the printer; and
outputting the generated setting value to the higher-level module.

2. The non-transitory computer readable storage medium according to claim 1, wherein the set of first instructions further comprises
acquiring from the higher-level module a set of printer-type information from among a plurality of sets of printer type information, each of the plurality of sets of printer type information indicating a type of a printer,
wherein the acquiring a printer characteristic value includes:
accessing a database which is configured to include a plurality of records each correlating a printer characteristic value and a set of printer-type information; and
acquiring from the database the printer characteristic value corresponding to the set of printer-type information which is acquired from the higher-level module.

3. The non-transitory computer readable storage medium according to claim 1, wherein the printer characteristic value includes a plurality of values for respective ones of a plurality of characteristic items, the plurality of characteristic items including a first characteristic item and a second characteristic item different from the first characteristic item,
wherein the set of first instructions further comprises
acquiring from the higher-level module a set of printer-type information from among a plurality of sets of printer type information, each of the plurality of sets of printer type information indicating a type of the printer,
wherein the acquiring a printer characteristic value includes:

specifying a location of a setting file relative to a specific folder, the setting file corresponding to the printer-type information, the setting file including a first characteristic value;

acquiring the first characteristic value which is stored in the setting file for the first characteristic item and corresponds to the set of printer-type information acquired from the higher-level module;

accessing a database which is configured to include a plurality of records each correlating a printer characteristic value and a set of printer-type information; and acquiring from the database a second characteristic value which is for the second characteristic item and corresponds to the set of printer-type information acquired from the higher-level module.

4. The non-transitory computer readable storage medium according to claim 3, wherein the set of program instructions further comprises a set of second program instructions controlling the computer to function as a generating module, the set of second program instructions comprising:

receiving the first characteristic value from the higher-level module; and generating the print data by using the first characteristic value.

5. The non-transitory computer readable storage medium according to claim 4, wherein the acquiring a printer characteristic value includes:

receiving a file path request for a file path from the higher-level module, the file path request including the set of printer-type information, the file path indicating a location of a setting file relative to a specific folder;

accessing a table storing a plurality of correlations each correlating a file path with a set of printer-type information;

specifying and acquiring the file path corresponding to the set of printer-type information included in the file path request from the table; and transmitting the file path as a response to the file path request to the higher-level module to prompt the higher-level module to specify the setting file using the file path and a folder path of the specific folder, to acquire the first characteristic value from the specified setting file, and to transmit the printer characteristic value to the module.

6. The non-transitory computer readable storage medium according to claim 1, wherein the API includes a class for generating an object used for generating the setting value, the object being generated by inputting the specific value into the class, wherein the set of first program instructions further comprises in response to calling the API from the higher-level module, transmitting the API to the higher-level module, wherein the transferring an API includes transferring the class to the higher-level module to prompt the higher-level module to input the specific value into the class for generating the object, the higher-level module transmitting the generated object to the module, wherein the acquiring a specific value includes receiving the object transmitted from the higher-level module, wherein the setting value is generated by processing the object while using the printer characteristic value.

7. The non-transitory computer readable storage medium according to claim 1, wherein the set of first program instructions further comprises receiving command-type information designating a command type from the higher-level module, wherein the outputting outputs one or more commands designated by the command-type information from among a first command, a second command, a third command, and a fourth command, wherein the first command includes the setting value, the second command is for prompting a transmission destination of the second command to interpret data to be received as raster data, the third command instructing the transmission destination to end preparation of receiving data, and the fourth command includes the printer-type information.

8. The non-transitory computer readable storage medium according to claim 1, wherein the set of first program instructions is written in a C++ program language.

9. The non-transitory computer readable storage medium according to claim 1, wherein the specific value includes at least one of a width of a sheet to be used in the printer, a length of the sheet, and a margin on the sheet, wherein the width, the length, and the margin are designated by a user.

10. A non-transitory computer readable storage medium storing a set of program instructions installed on and executed by a computer in an information processing apparatus having a communication interface, the set of program instructions being for inputting data into a printer via the communication interface, the set of program instructions including a set of first program instructions and a set of second program instructions, the set of first program instructions controlling the computer to function as a first module, the set of second program instructions controlling the computer to function as a second module lower than the first module to communicate with the first module, the set of first program instructions comprising:

calling an API;

transferring a specific value to the second module while inputting the specific value into the received API;

receiving a setting value from the second module via the communication interface; and transmitting the acquired setting value to the printer, wherein the set of second program instructions comprises:

an API configured to receive a specific value;

after the API is called from the first module:

acquiring the specific value through the API to which the first module inputs the specific value; and acquiring a printer characteristic value dependent on a type of the printer;

generating the setting value by using the specific value and the printer characteristic value, the setting value being in a data format which can be inputted to the printer; and outputting the generated setting value to the first module.

11. A non-transitory computer readable storage medium storing a set of program instructions installed on and executed by a computer in an information processing apparatus having a communication interface, the set of program instructions being for inputting data into a printer via the communication interface, the set of program instructions including a set of first program instructions, a set of second program instructions, and a set of third program instructions, the set of first program instructions controlling the computer to function as a first module, the set of second program instructions controlling the computer to function as a second module lower than the first module to communicate with the first module, the set of third program instructions controlling the computer to function as a third module, the set of first program instructions comprising:
  calling an API;
  transferring a specific value to the second module while inputting the specific value into the received API as an argument;
  receiving a setting value from the second module via the communication interface;
  acquiring image data;
  transferring the received setting value and the acquired image data to the third module;
  receiving print data from the third module; and
  transmitting the received print data to the printer,
  wherein the set of second program instructions comprises:
    an API configured to receive a specific value;
    after the API is called from the first module:
      acquiring the specific value through the API to which the first module inputs the specific value as an argument; and
      acquiring a printer characteristic value dependent on a type of the printer;
    generating the setting value by using the specific value and the printer characteristic value, the setting value being in a data format which can be inputted to the printer; and
    outputting the generated setting value to the first module,
  wherein the set of third program instructions comprises:
    acquiring the setting value and the image data;
    generating the print data having the acquired setting value based on the acquired image data; and
    transferring the generated print data to the first module.

12. The non-transitory computer readable storage medium according to claim 11, wherein the set of program instructions further comprises a set of fourth program instructions controlling the computer to function as fourth module, wherein the information processing apparatus further has a user inter face,
  wherein the set of fourth program instructions comprises:
    receiving a user input value via the user interface; and
    transmitting the user input value to the first module,
  wherein the set of first program instructions further comprises receiving the user input value from the fourth module, the specific value is based on the received user input value.

* * * * *